United States Patent
Meijer et al.

(10) Patent No.: US 9,852,711 B2
(45) Date of Patent: *Dec. 26, 2017

(54) SYNCHRONIZING USER INTERFACES OF CONTENT RECEIVERS AND ENTERTAINMENT SYSTEM COMPONENTS

(71) Applicant: ECHOSTAR UKRAINE, L.L.C., Kharkov (UA)

(72) Inventors: Hans Meijer, Kharkov (UA); Zane Eaton, Plymouth, WI (US)

(73) Assignee: EchoStar Ukraine, LLC, Kharkov (UA)

(*) Notice: Subject to any disclaimer, the term of this patent is extended or adjusted under 35 U.S.C. 154(b) by 0 days.

This patent is subject to a terminal disclaimer.

(21) Appl. No.: 15/055,207

(22) Filed: Feb. 26, 2016

(65) Prior Publication Data

US 2016/0203795 A1 Jul. 14, 2016

Related U.S. Application Data

(63) Continuation of application No. 13/825,305, filed as application No. PCT/UA2010/000066 on Sep. 21, 2010, now Pat. No. 9,274,667.

(51) Int. Cl.
*G06F 15/00* (2006.01)
*G06F 13/00* (2006.01)
(Continued)

(52) U.S. Cl.
CPC ............. *G09G 5/12* (2013.01); *G06F 3/048* (2013.01); *G06F 3/0484* (2013.01);
(Continued)

(58) Field of Classification Search
CPC . H04N 5/4403; H04N 7/17318; G06F 3/0304
(Continued)

(56) References Cited

U.S. PATENT DOCUMENTS

| 8,429,696 B2* | 4/2013 | Tecot | G11B 27/10 725/146 |
| 2006/0123455 A1* | 6/2006 | Pai | H04N 7/17318 725/133 |

(Continued)

*Primary Examiner* — Kevin Nguyen
(74) *Attorney, Agent, or Firm* — LK Global

(57) ABSTRACT

A content receiver may establish a communication connection with an entertainment system component. Utilizing the communication connection, the content receiver may control the entertainment system component in order to synchronize user interfaces the content receiver is operable to provide with user interfaces the entertainment system component is operable to provide. Hence, the user interfaces provided by the various entertainment system components may more closely resemble user interfaces of the content receiver, reducing user confusion. The content receiver may synchronize such user interfaces by altering software of the entertainment system component. In altering the software, the content receiver may replace or modify the software to change one or more aspects of one or more entertainment system user interfaces to that of one or more aspects of a content receiver user interface. The aspects may include visual properties, audio properties, and so on.

20 Claims, 9 Drawing Sheets

(51) Int. Cl.
*G09G 5/12* (2006.01)
*G06F 3/048* (2013.01)
*G06F 3/0484* (2013.01)
*G06F 3/14* (2006.01)
*H04N 21/485* (2011.01)
*H04L 29/06* (2006.01)
*H04L 29/08* (2006.01)

(52) U.S. Cl.
CPC ........ *G06F 3/1415* (2013.01); *H04L 65/4092* (2013.01); *H04L 67/34* (2013.01); *H04N 21/4858* (2013.01); *G09G 2370/06* (2013.01)

(58) Field of Classification Search
USPC .................... 715/718, 764, 716; 725/113, 46
See application file for complete search history.

(56) References Cited

U.S. PATENT DOCUMENTS

| | | | | |
|---|---|---|---|---|
| 2011/0067064 | A1* | 3/2011 | Karaoguz | G06F 3/0304 725/40 |
| 2013/0007793 | A1* | 1/2013 | Anthru | H04N 5/4403 725/14 |

* cited by examiner

SYNCHRONIZING USER INTERFACES OF CONTENT RECEIVERS AND ENTERTAINMENT SYSTEM COMPONENTS

CROSS-REFERENCE TO RELATED APPLICATION(S)

This application is a continuation of U.S. patent application Ser. No. 13/825,305, filed Mar. 20, 2013, now U.S. Pat. No. 9,274,667, which claims the benefit of international patent application number PCT/UA2010/000066, filed Sep. 21, 2010.

FIELD OF THE INVENTION

This disclosure relates generally to user interfaces, and more specifically to reducing user confusion by synchronizing user interfaces provided by content receivers and entertainment system components.

SUMMARY

The present disclosure discusses systems, and methods for synchronizing user interfaces of content receivers and entertainment system components. A content receiver and one or more entertainment system components may execute firmware to provide one or more user interfaces. These various user interfaces may be related to similar functions and may be provided via the same display devices. As such, the content receiver may be utilized to synchronize the user interfaces of the various entertainment system components by altering or replacing the respective firmware. Hence, the user interfaces provided by the various entertainment system components may more closely resemble user interfaces of the content receiver and user confusion may be reduced.

The content receiver may establish a communication connection with an entertainment system component, such as high-definition multimedia interface connection which utilizes a consumer electronics control protocol. Utilizing the communication connection, the content receiver may control the entertainment system component. The content receiver may then alter software of the entertainment system component such that one or more user interfaces of the entertainment system component more closely resemble those of the content receiver. In altering the software of the entertainment system component, the content receiver may replace or modify entertainment system component software to change one or more aspects of one or more entertainment system user interfaces to that of one or more aspects of a content receiver user interface. The aspects may include visual properties, audio properties, and so on.

In various implementations, the content receiver may determine a version of firmware on the entertainment system component, compare user interfaces associated with that firmware with content receiver user interfaces to identify differences, and alter or replace the firmware to eliminate one or more of the identified differences. When replacing the firmware of the entertainment system component, the content receiver may obtain replacement firmware from a content provider and install the replacement firmware on the entertainment system component.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION OF THE EMBODIMENTS

Figure 1:
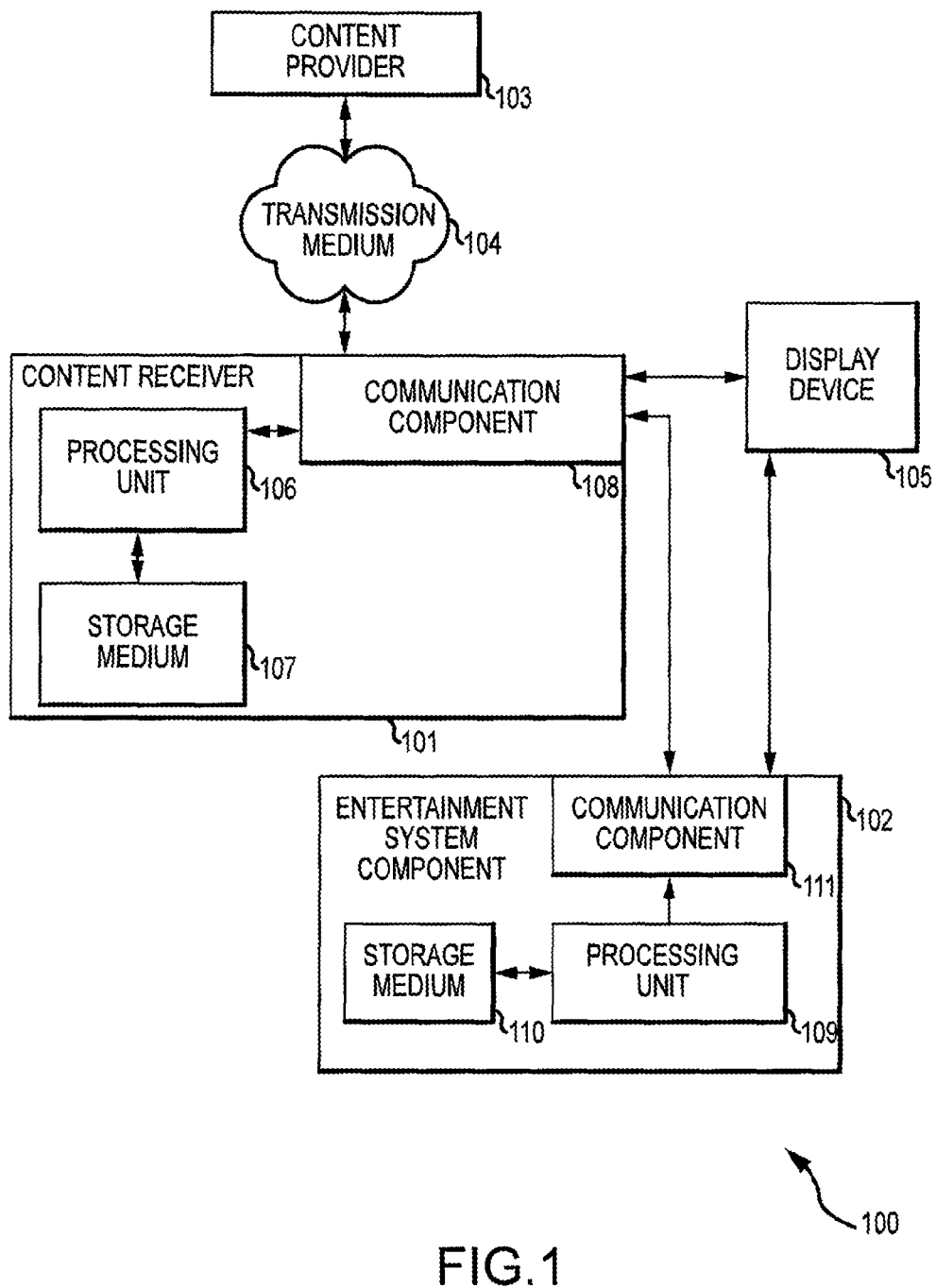
FIG. 1 is a block diagram illustrating a system for synchronizing user interfaces of content receivers and entertainment system components.

The description that follows includes sample systems, methods, and computer program products that embody various elements of the present disclosure. However, it should be understood that the described disclosure may be practiced in a variety of forms in addition to those described herein.

Content receivers may include devices such as set top boxes, cable boxes, digital versatile disc (DVD) players, video cassette recorders, compact disc (CD) players, radios, audio cassette players, digital video recorders, digital music players, personal computers, mobile computers, cellular telephones, and so on. Content receivers generally process and play content received from one or more content providers via one or more transmission media. The content providers may be satellite programming providers, cable programming providers, on-demand video providers, Internet content providers, DVD distributors, and so on. The transmission media may include communication link such as wired or wireless communication links, satellite communication links, coaxial communication links, fiber optic communication links, the Internet, cellular communication links, and so on. The transmission media may also include distribution (such as by mail, retail sales, and so on) of storage media such as DVDs, video cassettes, audio cassettes, compact discs, and so on.

Additionally, content receivers may be part of an entertainment system that includes a variety of different component devices (such as one or more receivers, digital versatile disc players, video cassette recorders, laser disc players, blue-ray disc players, high-definition DVD players, digital video recorders, video game systems, surround sound systems, audio systems, televisions, and so on) which may be utilized together in various combinations at various times. For example, a user of such an entertainment system may utilize a DVD player and a television together in order to watch a DVD movie. By way of a second example, the user may utilize a content receiver and a television together in order to watch television programming received from a television programming provider.

Content receivers and/or other entertainment system components are typically operable to generate one or more user interfaces (or menus) for display on an associated display device by executing one or more sets of firmware (i.e., software programs that internally control electronic devices). These user interfaces may enable users to interact with the content receiver and/or other entertainment system component to perform functions such as accessing content, changing device settings, and so on. For example, devices such as set top boxes and DVD players typically generate a visual setting menu to enable users to control visual settings such as contrast, brightness, hue, picture mode, saturation, sharpness, and so on. Multiple devices within an entertainment system may generate such user interfaces. Further, these multiple devices may all be configured to provide these user interfaces via the same display device, such as a television of the entertainment system. However, even though user interfaces for similar functions may all be provided via the same display device, aspects of the user interfaces (such as visual properties, audio properties, and so on) may differ. Differences between user interfaces for similar functions may result in user confusion as users may regard the entertainment system as a cohesive whole rather than a collection of disparate components.

The present disclosure discloses systems and methods of synchronizing user interfaces of content receivers and entertainment system components. By synchronizing the user interfaces, user confusion from disparate appearing menus may be reduced. User confusion may be particularly reduced when the user interfaces are related to similar functions and display on the same display device.

FIG. 1 is a block diagram illustrating a system 100 for synchronizing user interfaces of content receivers and entertainment system components. The system 100 includes a content receiver 101, an entertainment system component 102, a content provider 103, and one or more associated display devices 105. The content provider may provide content to the content receiver via a transmission medium utilizing a transmitter medium 104. The transmission medium may include any kind of transmission medium (wired, wireless, and so on) such as satellite, coaxial, fiber optic, the Internet, and so on. The transmission media may even include distribution (such as by mail, retail sales, and so on) of storage media such as DVDs, video cassettes, audio cassettes, compact discs, and so on. The content may include television programming, video on demand, audio programming, and so on.

The content receiver 101 may be any kind of content receiver, such as a television receiver, a set top box, a cable box, a computer, a DVD player, a CD player, a radio, a digital video recorder, a digital music player, and so on, that receives content provided by the content provider 103. The content receiver may include one or more processing units 106, a storage medium 107 (which may be any non-transitory machine-readable storage medium), and one or more communication components 108. The content receiver may be operable to store content that is received by the input component in the storage medium. In some implementations, the content receiver may process content that is received and/or content that is stored in the storage medium for play on the associated display device 105 (such as one or more televisions, speakers, computer monitors, and so on) via the communication component (which may include a port with a hardwired connection to the display device). The processing unit may execute software instructions stored in the storage medium to receive content provided by the content provider, process such content, and/or display processed content on the associated display device via the communication component. The processing unit may also execute firmware (i.e. one or more software programs that internally control the content receiver) stored in the storage medium to provide one or more user interfaces via the associated display device. The processing unit may execute the firmware in response to user input received by the communication component via a remote control device (not shown), selection elements (not shown) incorporated into the content receiver, and so on. Examples of such user interfaces include visual property menus, parental control menus, audio property menus, screensavers, captioning menus, and so on.

The entertainment system component 102 may be any kind of entertainment system component such as a DVD player, a video cassette recorder, a laser disc player, a blue-ray disc player, a high-definition DVD player, a digital video recorder, a video game system, a surround sound system, an audio system, a television, and so on. The entertainment system component may include one or more processing units 109, a storage medium 110 (which may be any non-transitory machine-readable storage medium), and one or more communication components 111. The entertainment system component may process content that is received and/or content that is stored in the storage medium for play on the associated display device 105 via the communication component (which may include a port with a hardwired connection to the display device). The processing unit may execute software instructions stored in the storage medium to process content and/or display processed content on the associated display device. The processing unit may also execute firmware (i.e. one or more software programs that internally control the entertainment system component) stored in the storage medium to provide one or more user interfaces via the associated display device. The processing unit may execute the firmware in response to user input received by the communication component via a remote control device (not shown), selection elements (not shown) incorporated into the content receiver, and so on.

In some implementations, the content receiver 101 and the entertainment system component 102 may each provide one or more user interfaces via the same associated display device 105. Further, although the entertainment system component and the associated display devices are shown and described as separate devices, in some implementations the associated display device may be incorporated into the entertainment system component.

The content receiver 101 may be communicably coupled to the entertainment system component 102 via the communication component 108 and the communication component 111 (which may include ports with hardwired connections). The content receiver may be operable to establish a communication connection with the entertainment system component. Further, the content receiver may be operable to control the entertainment system component via the established communication connection. In some implementations, the content receiver may be communicably coupled to the entertainment system utilizing a high-definition multimedia interface connection such as a HDMI™ cable. In such implementations, the content receiver may control the entertainment system component utilizing the consumer electronics control protocol.

The content receiver 101 may control the entertainment system component 102 via the established communication connection to alter the firmware of the entertainment system component or install new firmware to replace existing firmware. In this way, the content receiver may alter one or more user interfaces the entertainment system component is operable to provide one or more user interfaces via the associated display device 105. By altering user interfaces the entertainment system component is operable to provide, the content receiver may change one or more aspects of entertainment system component user interfaces to that of one or more aspects of content receiver user interfaces. Thus, the user interfaces provided by the entertainment system component more closely resemble user interfaces the content receiver is operable to provide, reducing user confusion.

The content receiver 101 may change a variety of different aspects of a user interface that the entertainment system component 102 is operable to provide by altering or replacing the firmware of the entertainment system component. For example, the aspect may include one or more visual properties. These visual properties may include a vertical and/or horizontal position of one or more elements of the user interface, a horizontal and/or vertical dimension of one or more elements of the user interface, a color utilized in the user interface, a shape of an object of the user interface, a font utilized in the user interface, a font size of a font utilized in the user interface, a brightness of one or more elements of the user interface, a contrast of one or more elements of the user interface, a hue of one or more elements of the user interface, a language utilized in the user interface, or more items of text utilized in the user interface, a saturation of one or more elements of the user interface, a sharpness of one or more elements of the user interface, and so on. By way of another example, the aspect may include one or more auditory properties, such as a specific alert noise that is played when an improper selection is made, musical selections that are played during presentation of the user interface, auditory (i.e., speech) presentation of one or more textual elements of the user interface, a volume at which auditory alerts are presented for the user interface, and so on.

As part of altering or replacing the firmware of the entertainment system component 102, the content receiver 101 may determine the firmware that is included in the entertainment system component, the version of that firmware, and so on. The content receiver may determine alterations to make to the firmware or other firmware to install to replace the existing firmware based on the determined firmware information. In some implementations, the content receiver may determine the firmware version and/or other information about the firmware of the entertainment system component by querying the entertainment system component, whether by the established communication connection or via one or more other communication connections. In other implementations, the content receiver may consult one or more databases stored in the storage medium 107 to determine information about the firmware of the entertainment system component. This database may be constructed based on user input which details the information about the firmware. In still other implementations, the content receiver may receive the information from the content provider 103.

Further, as part of altering or replacing the firmware of the entertainment system component 102, the content receiver 101 may compare the user interface of the entertainment system component with one or more user interfaces of the content receiver. The content receiver may identify one or more differences between the user interfaces based on this comparison. The aspects of the user interface of the entertainment system component that the content receiver changes may correspond to these identified differences. Thus, the content receiver may alter or replace the firmware of the entertainment system component to eliminate one or more of these differences, resulting in user interfaces of the entertainment system component and the content receiver that more closely resemble each other.

Moreover, as part of altering or replacing the firmware of the entertainment system component 102, the content receiver 101 may determine whether or not the alteration or replacement of the firmware is successful. If the content receiver is unable to alter or replace the firmware of the entertainment system component (such as if the entertainment system component does not accept the alteration or replacement), the content receiver may be configured to report an error status message. Such an error status message may include an error message that the content receiver sends to the content provider 103. The content receiver may also be configured to report a successful status message if the content receiver is able to alter or replace the firmware of the entertainment system component.

When the content receiver 101 installs new firmware on the entertainment system component 102, the content receiver may install new firmware that the content receiver obtains from the content provider 103. In some implementations, the content receiver may request specific new firmware from the content provider based on information the content receiver determines about the existing firmware of the entertainment system component. In other implementations, the content receiver may regularly receive firmware from the content provider for a variety of different entertainment system components and may select new firmware to install from such received firmware.

Although the system 100 is shown and described above in the context of the content provider 102 providing a single stream of content to the content receiver 101 via the transmission medium 103, it is understood that other configurations are possible without departing from the scope of the present disclosure. For example, the content provider may multiplex multiple streams of content and provide the multiplexed content to the content receiver. The content receiver may then demultiplex and select one or more streams of the content. Additionally, the content provider may encrypt content, scramble content, and so on before providing the content via the transmission medium. In such cases, upon receipt of content the content receiver may appropriately decrypt received content, descramble received content, and so on. Further, the content provider may include various components for providing content and performing other functions without departing from the scope of the present disclosure. For example, the content provider may include one or more programming sources, storage networks, broadcast centers, head end components, and so on, which may be arranged in a variety of configurations without departing from the scope of the present disclosure.

Figure 2:
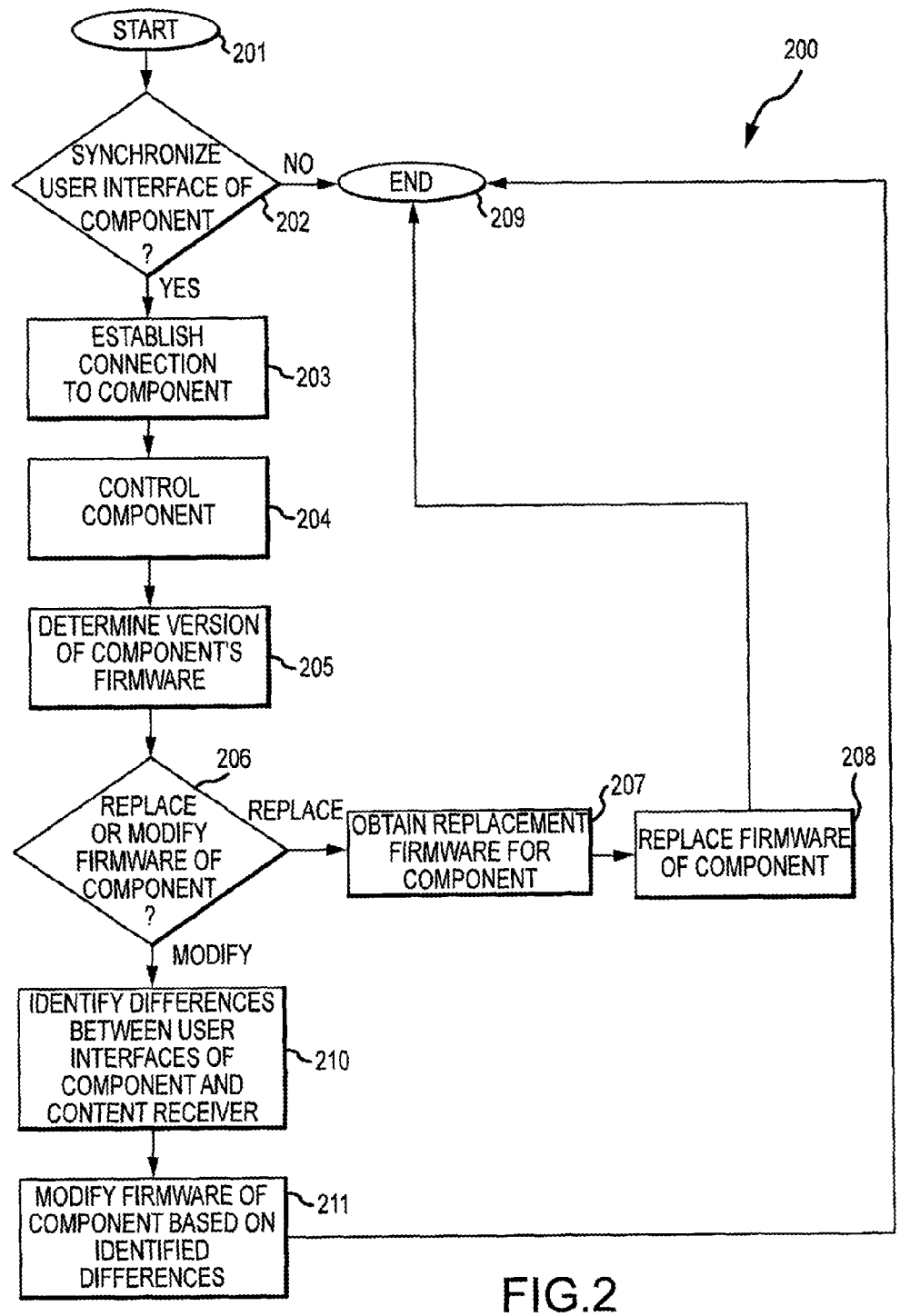
FIG. 2 is a flow chart illustrating a method of synchronizing user interfaces of content receivers and entertainment system components that may be performed by the system of FIG. 1.

FIG. 2 illustrates a method 200 of synchronizing user interfaces of content receivers and entertainment system components which may be performed by the content receiver 101. The flow begins at block 201 and proceeds to block 202 where the content receiver 101 determines whether to synchronize one or more user interfaces of the content receiver and the entertainment system component 102. If content receiver 101 determines to synchronize one or more user interfaces, the flow proceeds to block 203. Otherwise, the flow proceeds to block 209 and ends.

At block 203, after the content receiver 101 determines to synchronize one or more user interfaces, the content receiver establishes a communication connection with the entertainment system component 102. The flow then proceeds to block 204 where the content receiver control the entertainment system component via the communication connection. Next, the flow proceeds to block 205 where the content receiver determines a version of firmware of the entertainment system component. The flow then proceeds to block 206.

At block 206, the content receiver 101 determines whether to replace or modify the firmware of the entertainment system component 102. If the content receiver determines to replace the firmware of the entertainment system component, the flow proceeds to block 206. However, if the content receiver determines to modify the firmware of the entertainment system component, the flow proceeds to block 210.

At block 207, the content receiver 101 obtains new firmware with which to replace the existing firmware of the entertainment system component 102. The content receiver may obtain the new firmware from the content provider 103. The flow then proceeds to block 208 where the content receiver replaces the firmware of the entertainment system component by installing the new firmware on the entertainment system component. As part of installing the new firmware, the content receiver 101 may determine whether or not the installation is successful and may report a related status message to the content provider. Then the flow proceeds to block 209 and ends.

At block 210, after the content receiver 101 determines to modify the firmware of the entertainment system component, the content receiver compares the user interface of the entertainment system component with the user interface of the content receiver to identify one or more differences. Next, at block 211 the content receiver modifies the firmware of the entertainment system component via the established communication connection to eliminate one or more of the identified differences, thus changing one or more aspects of the user interface of the entertainment system component to that of the user interface of the content receiver. As part of modifying the firmware, the content receiver 101 may determine whether or not the modification is successful and may report a related status message, such as a status message reported to the content provider 103. The flow then proceeds to block 209 and ends.

Figure 3:
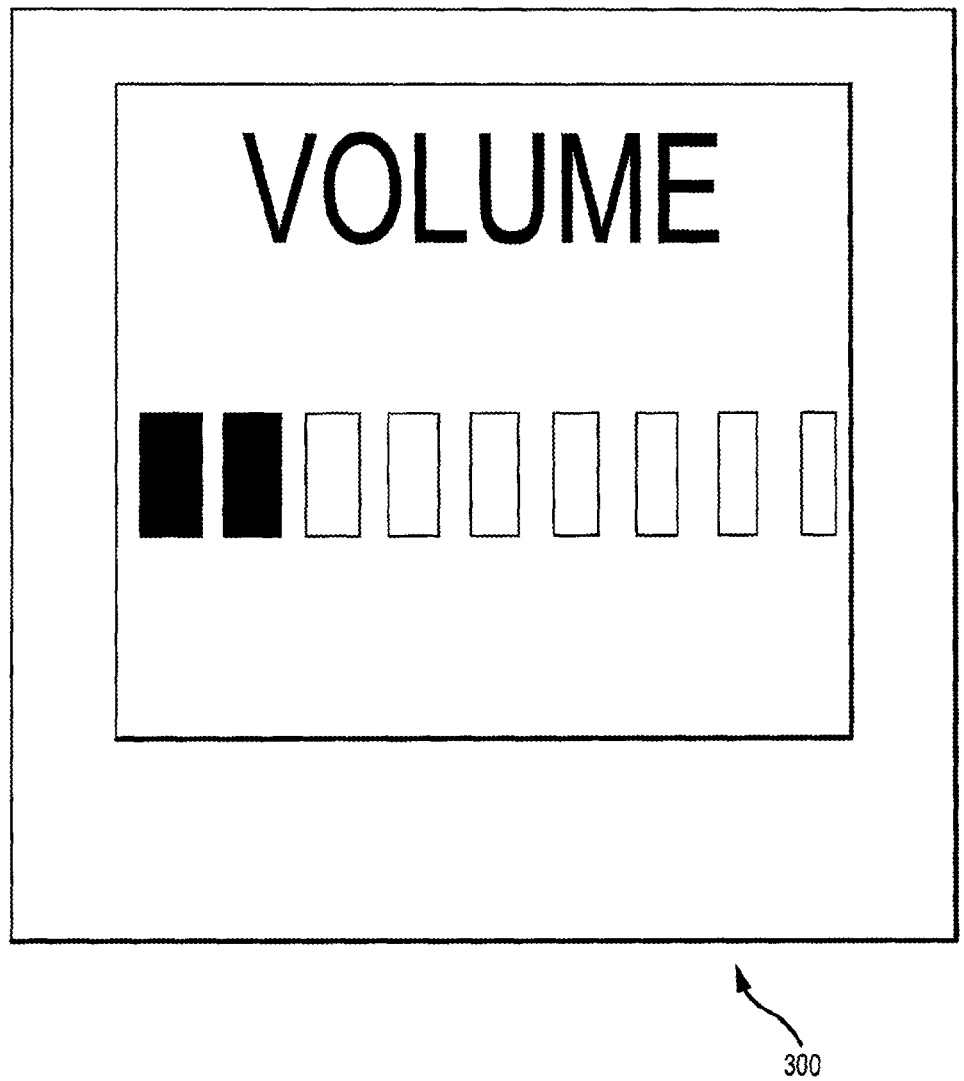
FIG. 3 illustrates an example volume menu displayable by a content receiver on an associated display device.

FIG. 3 illustrates an example content receiver volume menu 300 that the content receiver 101 may display on the associated display device 105. As illustrated, the content receiver menu is square-shaped and occupies the majority of the display. Further, the menu includes the text "volume" in all capital letters and a graphical indicator of a volume level which are both in a horizontal orientation. As shown, the graphical volume level indicator includes nine squares that are displayed as either filled or empty to visually indicate the volume level.

Figure 4A:
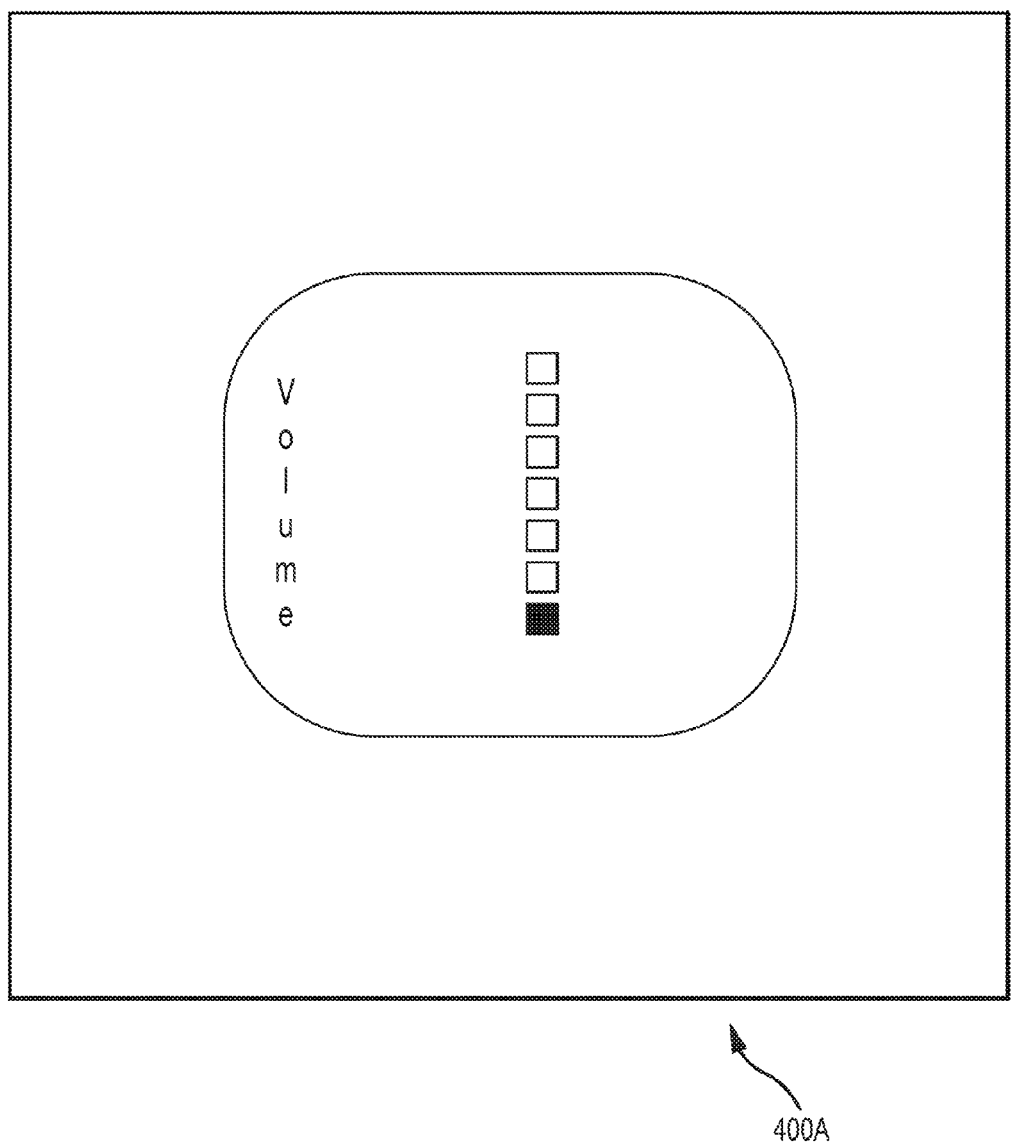
FIG. 4A illustrates an example volume menu displayable by a television.

FIG. 4A illustrates an example entertainment system component volume menu 400A that the entertainment system component 102 may display on the associated display device 105. In this example the entertainment system component may be a television and the associated display device may be incorporated into the television. As illustrated, the entertainment system component menu is a square shape with rounded edges and occupies the center portion of the display. Further, the menu includes the text "volume" with only the first letter capitalized and a graphical indicator of a volume level which are both in a vertical orientation. As shown, the graphical volume level indicator includes seven squares that are displayed as either filled or empty to visually indicate the volume level.

As the example content receiver volume menu 300 and the entertainment system component volume menu 400A may be displayed on the same associated display device 105 in this example, the differences between the two menus may confuse users. Despite the differences between the two menus, both are volume menus and both are displayed on the associated display device. Users may not understand why two different volume menus display when they interact with the system 100, perhaps not comprehending that each menus is produced by a different device as the users may consider the system to be a unified entertainment system.

FIGS. 4B through 4F illustrate versions of the example entertainment system component volume menu of FIG. 4A after the content receiver 100 alters the firmware of the entertainment system component 102 to synchronize the corresponding volume menus of the content receiver and the entertainment system component. Thus, the entertainment system component volume menus 400B-400F illustrated in FIGS. 4B through 4F resemble the content receiver volume menu 300 of FIG. 3 more closely than the entertainment system component volume menu 400A illustrated in FIG. 4A does.

Figure 4B:
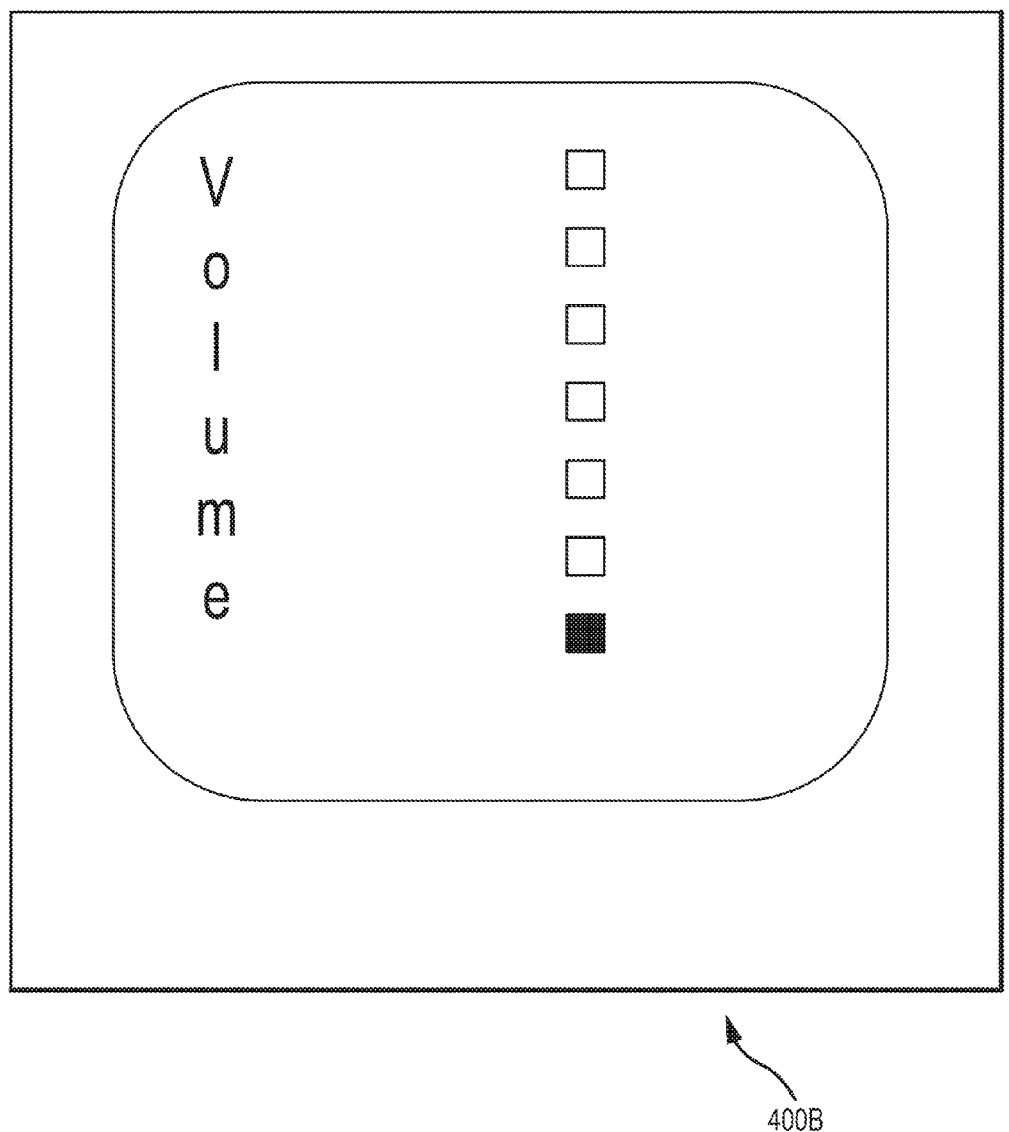
FIGS. 4B-4F illustrate versions of the example volume menu of FIG. 4A after various synchronizations with the example volume menu of FIG. 3 by the system of FIG. 1.

In FIG. 4B, the content receiver alters the firmware of the entertainment system component such that the vertical and horizontal dimensions of the entertainment system component volume menu 400B are the same as the vertical and horizontal position of the content receiver volume menu 300. Thus, the entertainment system component volume menu 400B more closely resembles the content receiver volume menu 300 of FIG. 3 than does the entertainment system component volume menu 400A illustrated in FIG. 4A.

Figure 4C:
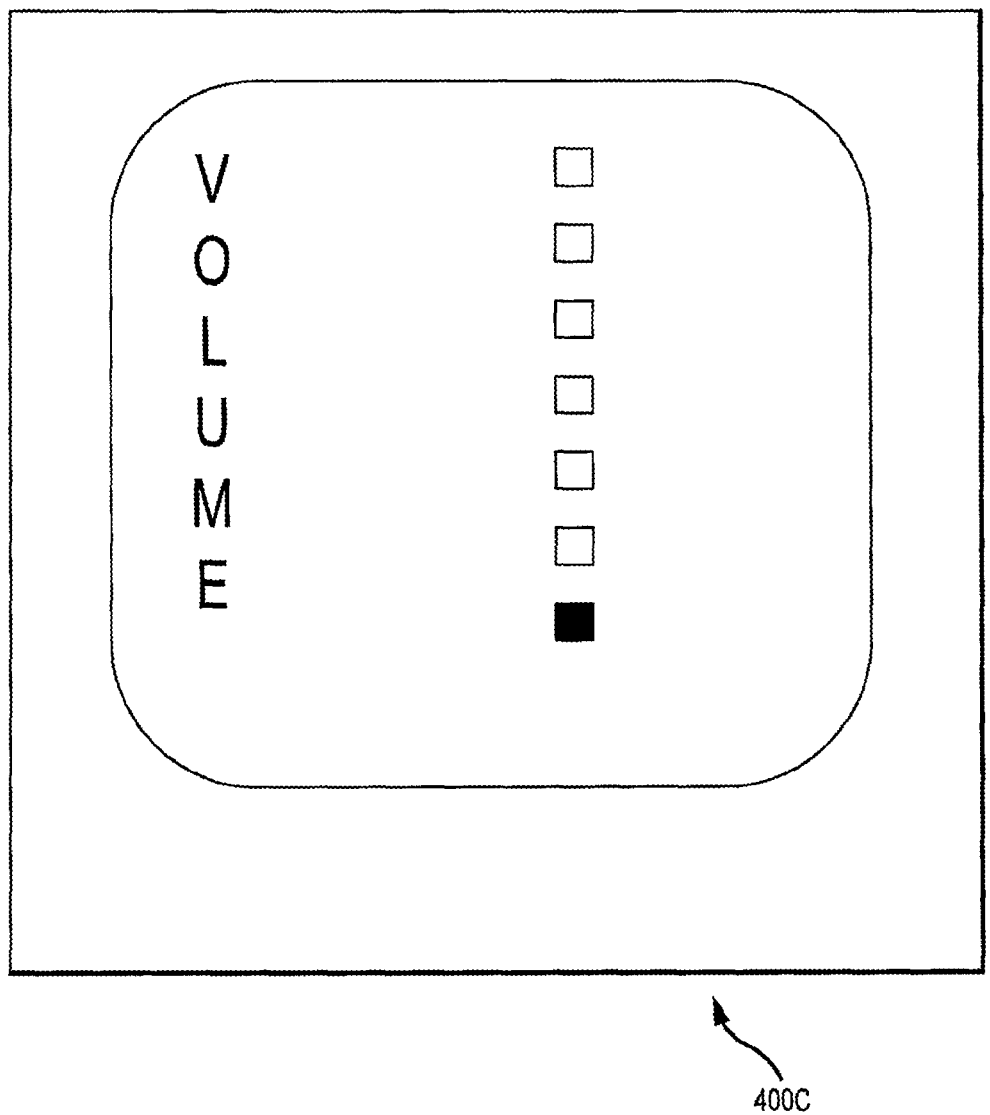

In FIG. 4C, like in the version illustrated in FIG. 4B, the content receiver alters the firmware of the entertainment system component such that the vertical and horizontal dimensions of the entertainment system component volume menu are the same as the vertical and horizontal position of the content receiver volume menu 300. Further, the content receiver alters the firmware such that the text "volume" displays in all capital letters similar to the content receiver volume menu of FIG. 3. Thus, the entertainment system component volume menu 400C more closely resembles the content receiver volume menu 300 of FIG. 3 than either the entertainment system component volume menu 400A illustrated in FIG. 4A or the entertainment system component volume menu 400B.

Figure 4D:
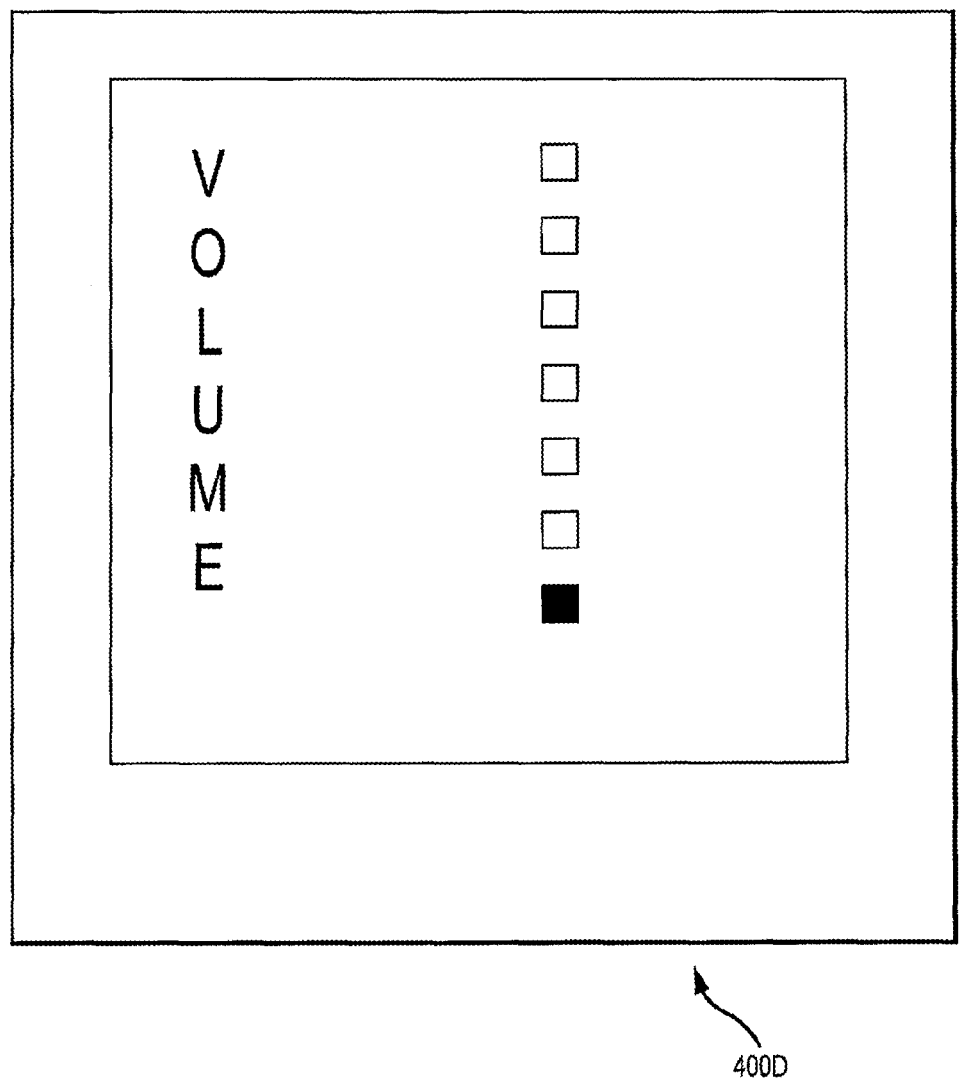

In FIG. 4D, similar to the version illustrated in FIG. 4B, the content receiver alters the firmware of the entertainment system component such that the vertical and horizontal dimensions of the entertainment system component volume menu are the same as the vertical and horizontal position of the content receiver volume menu 300. Further, like in the version illustrated in FIG. 4C, the content receiver alters the firmware such that the text "volume" displays in all capital letters similar to the content receiver volume menu of FIG. 3. Additionally, the content receiver also alters the firmware such that the entertainment system component volume menu is square-shaped like the content receiver volume menu 300 rather than a square shape with rounded edges. Thus, the entertainment system component volume menu 400D more closely resembles the content receiver volume menu 300 of FIG. 3 than either the entertainment system component volume menu 400A illustrated in FIG. 4A, the entertainment system component volume menu 400B, or the entertainment system component volume menu 400C.

Figure 4E:
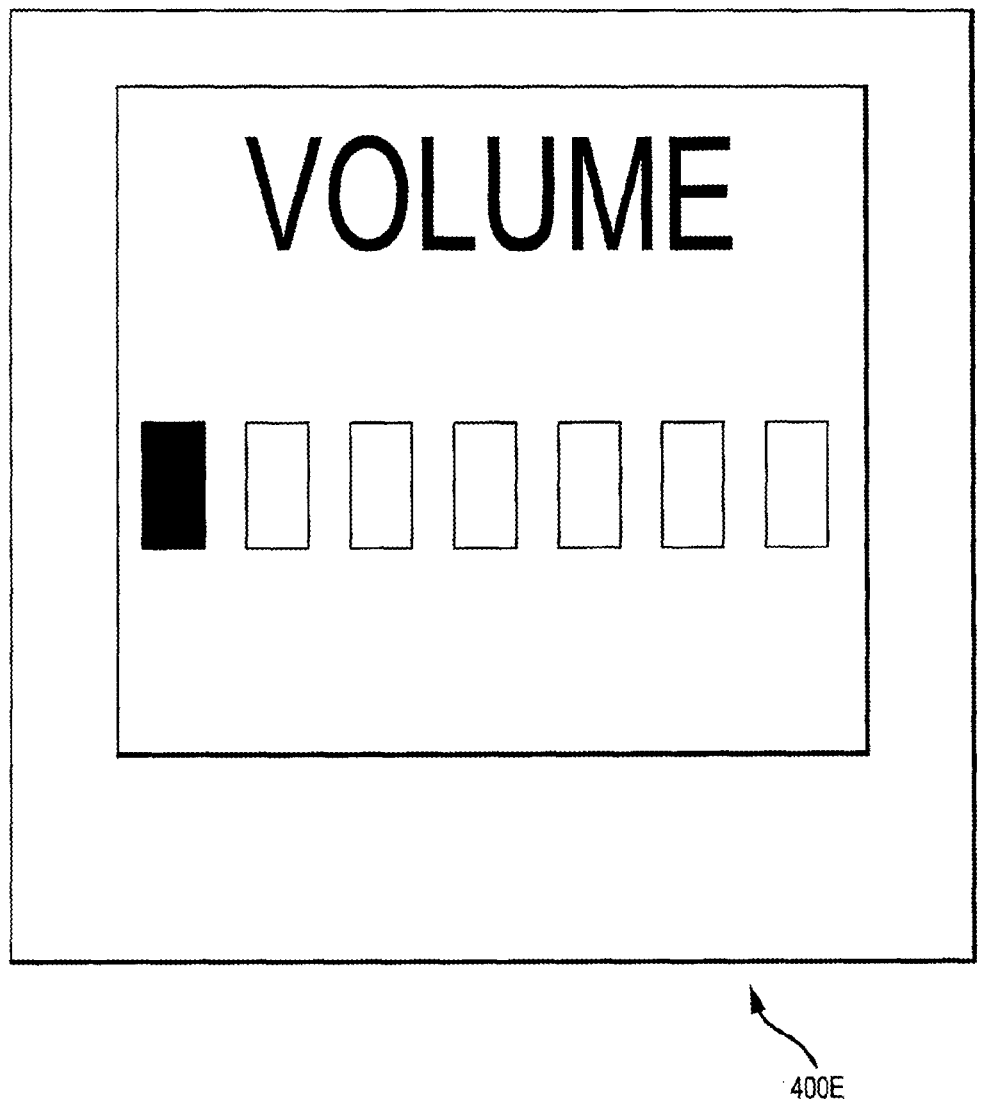

In FIG. 4E, like the version illustrated in FIG. 4B, the content receiver alters the firmware of the entertainment system component such that the vertical and horizontal dimensions of the entertainment system component volume menu are the same as the vertical and horizontal position of the content receiver volume menu 300. Further, similar to the version illustrated in FIG. 4C, the content receiver alters the firmware such that the text "volume" displays in all capital letters similar to the content receiver volume menu of FIG. 3. Additionally, like the version illustrated in FIG. 4D, the content receiver also alters the firmware such that the entertainment system component volume menu is square-shaped like the content receiver volume menu 300 rather than a square shape with rounded edges. Moreover, the firmware is altered such that the text "volume" and the graphical volume level indicator are in a horizontal orientation like the content receiver volume menu 300 rather than a vertical orientation. Thus, the entertainment system component volume menu 400E more closely resembles the content receiver volume menu 300 of FIG. 3 than either the entertainment system component volume menu 400A illustrated in FIG. 4A, the entertainment system component volume menu 400B, the entertainment system component volume menu 400C, or the entertainment system component volume menu 400D.

Figure 4F:
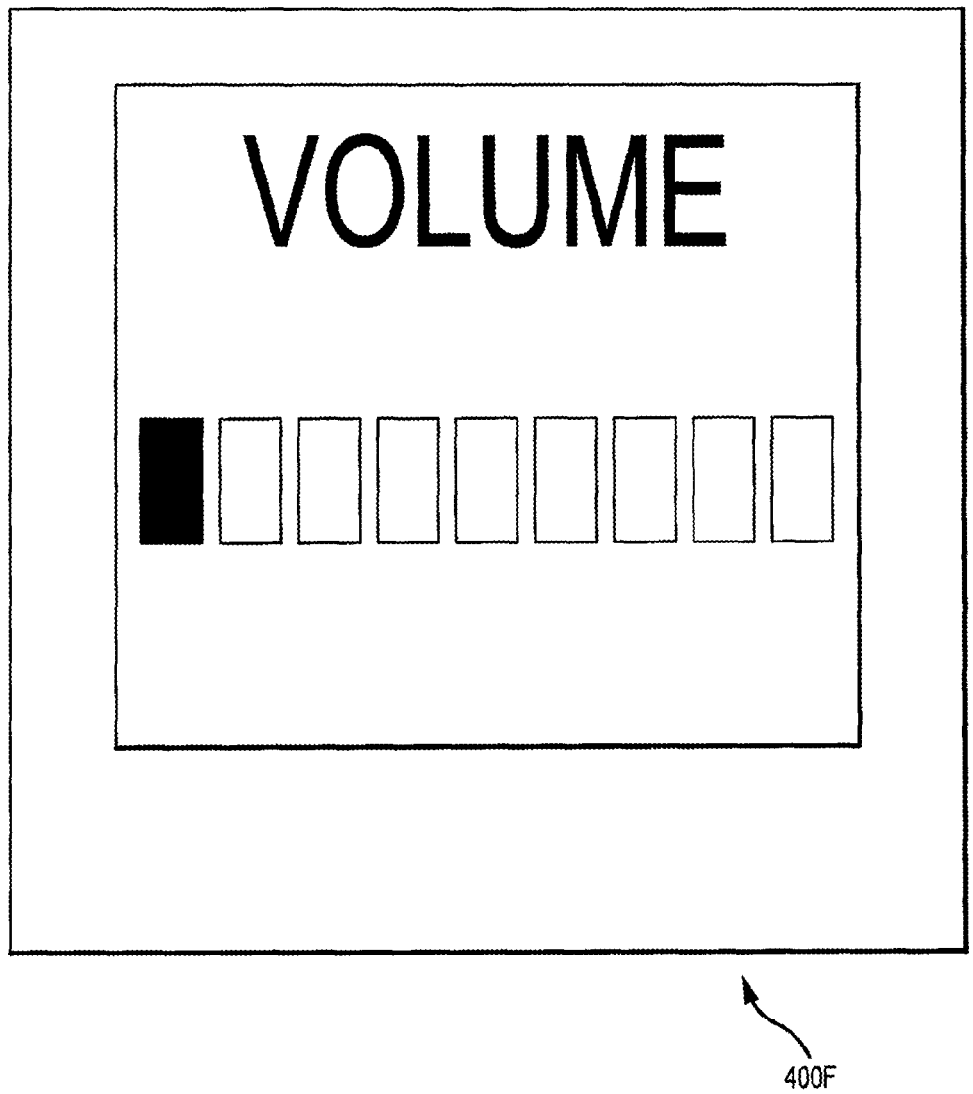

In FIG. 4F, like the versions illustrated in FIG. 4B-4E, the content receiver alters the firmware of the entertainment system component such that the vertical and horizontal dimensions of the entertainment system component volume menu are the same as that of the content receiver volume menu 300, the text "volume" displays in all capital letters, the content receiver volume menu is square-shaped, and the text "volume" and the graphical volume level indicator are in a horizontal orientation like the content receiver volume menu 300. Moreover, the graphical volume level indicator includes nine squares like the content receiver volume menu 300 instead of seven. Thus, the entertainment system component volume menu 400F more closely resembles the content receiver volume menu 300 of FIG. 3 than all of the entertainment system component volume menus 400A-400F, being almost identical to the content receiver volume menu 300 of FIG. 3.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a: magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for synchronizing user interfaces of a content receiver and an entertainment system component, the method comprising:
    establishing, by the content receiver, a communication connection from a content receiver to a consumer electronics device, wherein the communication connection comprises a high-definition multimedia interface connection utilizing a consumer electronics control protocol;
    controlling the consumer electronics device utilizing the content receiver via the communication connection;
    identifying, utilizing the content receiver, at least one difference between a first user interface presented by the consumer electronics device and a second user interface presented by the content receiver; and
    synchronizing, by the content receiver, the first user interface and the second user interface, by:
        identifying one or more differences between the first user interface and the second interface; and
        eliminating at least one of the identified one or more differences, via the communication connection.

2. The method of claim 1, further comprising determining, utilizing the content receiver, a version of the software of the consumer electronics device.

3. The method of claim 2, wherein the operation of determining the version of the software comprises querying the consumer electronics device.

4. The method of claim 1, wherein the one or more differences comprises at least one of a visual property and an audio property.

5. The method of claim 4, wherein the visual property comprises at least one of a color, a horizontal dimension, a vertical dimension, an object shape, a font, a font size, a brightness, a contrast, a user interface language, text, a vertical position, or a horizontal position.

6. The method of claim 1, wherein the consumer electronics device is operable to present the first user interface via a display device and the content receiver is operable to present the second user interface via the display device.

7. The method of claim 1, wherein the operation of controlling the consumer electronics device comprises controlling the consumer electronics device utilizing a consumer electronics control protocol.

8. The method of claim 1, wherein synchronizing the first user interface and the second user interface further comprises altering software of the consumer electronics device, by the content receiver, to eliminate the at least one of the identified one or more differences.

9. The method of claim 8, wherein the operation of altering the software of the entertainment system component comprises installing a new software component on the consumer electronics device.

10. The method of claim 9, further comprising receiving the new software component by the content receiver from a content provider.

11. A content receiver, comprising:
- at least one non-transitory storage medium;
- at least one processing unit, operable to execute content receiver software stored in the at least one content receiver non-transitory storage medium to present a second user interface; and
- a communication component operable to establish a communication connection to a consumer electronics device operable to present a first user interface, the communication connection comprising a high-definition multimedia interface connection utilizing a consumer electronics control protocol;
- wherein the at least one processing unit is operable to:
  - identify one or more differences between the first user interface and the second user interface; and
  - eliminate at least one of the identified one or more differences, via the communication connection.

12. The content receiver of claim 11, wherein the communication component is communicatively coupled to a display device that is also in communication with the consumer electronics device;
- wherein the display device is configured to present the first user interface; and
- wherein the at least one processing unit is further configured to initiate presentation of the second user interface via the display device.

13. The content receiver of claim 12, wherein the display device is incorporated into the consumer electronics device.

14. The content receiver of claim 11, wherein the at least one processing unit is further operable to synchronize the first user interface and the second user interface, by:
- altering, via the communication connection, software of the consumer electronics device, to eliminate the at least one of the identified one or more differences.

15. The system of claim 14, wherein the at least one processing unit alters the software of the consumer electronics device by installing a new software component on the consumer electronics device, via the communication connection.

16. The content receiver of claim 14, wherein the at least one processing unit is operable to determine a version of the software of the consumer electronics device.

17. The content receiver of claim 16, wherein the at least one processing unit determines the version of the software of the consumer electronics device by querying the consumer electronics device via the communication connection.

18. The content receiver of claim 11, wherein the consumer electronics device comprises a television.

19. The content receiver of claim 11, wherein the at least one processing unit is further configured to:
- identify a first visual property of the first user interface that differs from a second visual property of the second user interface; and
- change the first visual property of the first user interface to create a changed first user interface resembling the second user interface;
- wherein eliminating the at least one of the identified one or more differences comprises changing the first visual property.

20. A computer program product, the computer program product comprising:
- a first set of instructions, stored in at least one non-transitory computer readable storage medium, executable by at least one processing unit to establish a communication connection from a content receiver to a consumer electronics device, the communication connection comprising a high-definition multimedia interface connection utilizing a consumer electronics control protocol;
- a second set of instructions, stored in the at least one non-transitory computer readable storage medium, executable by the at least one processing unit to control the consumer electronics device utilizing the content receiver via the communication connection;
- a third set of instructions, stored in the at least one non-transitory computer-readable storage medium, executable by the at least one processing unit to identify, utilizing the content receiver, at least one difference between a first user interface the consumer electronics device is operable to present and a second user interface the content receiver is operable to present; and
- a fourth set of instructions, stored in the at least one non-transitory computer readable storage medium, executable by the at least one processing unit to synchronize the first user interface and the second user interface by identifying one or more differences between the first user interface and the second user interface, and eliminating at least one of the identified one or more differences, via the communication connection.

* * * * *